United States Patent
Liu et al.

(10) Patent No.: US 7,830,417 B2
(45) Date of Patent: Nov. 9, 2010

(54) SYSTEM AND METHOD FOR INTERACTING WITH OBJECTS VIA A CAMERA ENHANCED MOBILE DEVICE

(75) Inventors: Qiong Liu, Milpitas, CA (US); Donald Kimber, Foster City, CA (US); Patrick Chiu, Menlo Park, CA (US); Laurent Denoue, Palo Alto, CA (US); Jack Yang, Beijing (CN); Hanning Zhou, Seattle, WA (US)

(73) Assignee: Fuji Xerox Co., Ltd, Tokyo (JP)

( * ) Notice: Subject to any disclaimer, the term of this patent is extended or adjusted under 35 U.S.C. 154(b) by 644 days.

(21) Appl. No.: 11/504,873

(22) Filed: Aug. 15, 2006
(Under 37 CFR 1.47)

(65) Prior Publication Data

US 2008/0200205 A1     Aug. 21, 2008

(51) Int. Cl.
*H04N 5/225* (2006.01)
(52) U.S. Cl. ................................. 348/211.99
(58) Field of Classification Search ............ 348/211.99; 725/105
See application file for complete search history.

(56) References Cited

U.S. PATENT DOCUMENTS

| | | | |
|---|---|---|---|
| 4,855,746 A | 8/1989 | Stacy | 341/176 |
| 4,959,810 A | 9/1990 | Darbee et al. | 364/900 |
| 5,898,397 A | 4/1999 | Murray | 341/176 |
| 6,020,829 A | 2/2000 | Hormann | 340/825.69 |
| 2006/0015925 A1* | 1/2006 | Logan | 725/135 |
| 2006/0195876 A1* | 8/2006 | Calisa | 725/105 |

OTHER PUBLICATIONS

S. Uchihashi, et al., "Video Manga: Generating Semantically Meaningful Video Summaries", *Proc. ACM Multimedia*, (Orlando FL), ACM Press, 1999, pp. 383-392 (10 pages).

Intersense Incorporated, "IS-600 Mark 2 Precision Motion Tracker", http://www.isense.com/products/prec./is600/index.htm (2 pages).

A. Fox, et al., "Integrating Information Appliances into an Interactive Workspace", *IEEE Computer Graphics and Applications*, May/Jun. 2000, pp. 54-65.

J. Rekimoto, "A Multiple Device Approach for Supporting Whiteboard-based Interactions", *ACM Conference on Human Factors in Computing Systems*, (CHI 1998) (8 pages).

(Continued)

*Primary Examiner*—Tuan Ho
(74) *Attorney, Agent, or Firm*—Fliesler Meyer LLP

(57) ABSTRACT

Embodiments of the present invention enable an image based controller to control and manipulate objects with simple point-and-capture operations via images captured by a camera enhanced mobile device. Powered by this technology, a user is able to complete many complicated control tasks via guided control of objects without utilizing laser pointers, IR transmitters, mini-projectors, or bar code tagging and/or customized wall paper are not needed for the environment control. This description is not intended to be a complete description of, or limit the scope of, the invention. Other features, aspects, and objects of the invention can be obtained from a review of the specification, the figures, and the claims.

17 Claims, 5 Drawing Sheets

OTHER PUBLICATIONS

N. Khotake, et al., "InfoStick: An Interaction Device for Inter-Appliance Computing", *Workshop on Handheld and Ubiquitous Computing (HUC '99)*, 1999 (13 pages).

S. Wray, et al., "The Medusa Applications Environment", *Proc. ACM Multimedia*, 1994, pp. 265-273 (9 pages).

T. Hodes, et al., "Shared Remote Control of a Video Conferencing Application: Motivation, Design, and Implementation", *SPIE Multimedia Computing and Networking* (MMCN '99), Jan. 1999, pp. 17-28 (12 pages).

T. Starner, et al., "The Gesture Pendant: A Self-illuminating, Wearable, Infrared Computer Vision System for Home Automation Control and Medical Monitoring", *Proceedings of IEEE International Symposium on Wearable Computing*, (ISWC 2000), Atlanta, Georgia, Oct. 2000 (17 pages).

N.A. Streitz, et al., "i-LAND: An interactive Landscape for Creativity and Innovation", *ACM Conference on Human Factors in Computing Systems*, (CHI '99), Pittsburgh, Pennsylvania, USA, May 15-20, 1999, ACM Press, NY, pp. 120-127. http://wwp.darmstad,gmd.de/ambiente/paper/chi99Reprint.pdf.

J.R. Cooperstock, et al., "Reactive Environments: Throwing away your keyboard and mouse", *Communications of the ACM*, vol. 40, No. 9, Sep. 1997, pp. 65-73. http://citeseer.nj.nec.com/cooperstock97reactive.html; http://www.dgp.toronto.edu/people/rroom/research/papers/cacm/cacm.html.

Brummit, B.L., et al., "EasyLiving: Technologies for Intelligent Environments", *Proceedings of $2^{nd}$ International Symposium on Handheld and Ubiquitous Computing*, Bristol, UK, Sep. 2000, pp. 12-29 (15 pages).

S. Zhai, "User Performance in Relation to 3D Input Device Design", *Computer Graphics*, (ACM), Nov. 1998, pp. 50-54 (6 pages).

D.G. Lowe, "Distinctive Image Features from Scale-Invariant Keypoints", *International Journal of Computer Vision*, 2004, pp. 1-28.

Berna Erol, et al., "Linking Multimedia Presentations with their Symbolic Source Documents: Algorithm and Applications", *ACM Multimedia '03*, Berkeley, CA, Nov. 2-8, 2003, pp. 498-507.

Berna Erol, et al., "Linking Presentation Documents Using Image Analysis", *Asilomar Conference on Signals, Systems, and Computers*, Pacific Grove, CA, Nov. 9-12, 2003 (5 pages).

Chiu, P., et al., "Room with a Rear View: Meeting Capture in a Multimedia Conference Room", IEEE Multimedia Magazine, vol. 7, No. 4, Oct.-Dec. 2000, pp. 48-54.

Hannuksela, J., et al., "A Vision-based Approach for Controlling User Interfaces of Mobile Devices", *Proc. IEEE Workshop on Vision for Human-Computer Interaction*, (V4HCI), San Diego, CA (6 pages).

\* cited by examiner

SYSTEM AND METHOD FOR INTERACTING WITH OBJECTS VIA A CAMERA ENHANCED MOBILE DEVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to the field of remote control of objects.

2. Description of the Related Art

The invention of the computer mouse facilitates the control of computer programs via a two-dimensional (2D) graphical user interface. However, because a regular computer mouse is a 2D input device, people did not consider it for physical object control for a long time. To facilitate users' interactions with physical objects, researchers used video to map the real world to 2D space for mouse control. Since that technology requires fixed cameras in the controlled environment for user-environment interaction, people have to wait for property owners to set up the hardware and software before they can try that technology. Moreover, because of the regular mouse usage in that technology, people normally have to interact with an environment using desktops, laptops, or PDAs with pen inputs. The regular mouse based system is convenient for interacting with a remote location. However, it is not very natural for interacting with onsite physical objects.

Since physical objects exist in 3D space, it is reasonable to consider a 6 Degree of Freedom (DOF) input device for physical object control. Many 6 DOF input devices were proposed for three dimensional (3D) interfaces. However, there is still not an obvious winner suitable for all applications. For physical object control, people normally cannot see a cursor float in air without a specifically designed projection system, making it difficult to use most 6 DOF input devices.

To interact with objects in physical world, a user has to locate the object he/she wants to manipulate, and/or specify the path for manipulation. In a virtual world where any object can be moved anywhere, a 6 DOF device is necessary for full control of an object. In the physical world, device movement and data transfer are much more constrained than that in a virtual world. These constraints offer opportunities for controlling physical devices through video of a physical world scene using a regular computer mouse. They also enable us to control devices with pointing device, such as an IR based remote control or a laser pointer. The most popular remote controls are IR based or RF based. Since a regular RF controller is not directional, it normally needs complicated control interface for managing multiple devices. A directional IR controller can reduce user interface complications by using the physical object distribution cue. However, the requirement for the transmitter and receiver pair still limits the IR control system deployment. Similar problems exist for a laser pointer based control system.

SUMMARY OF THE INVENTION

Various embodiments of the present invention facilitate user interactions with objects via a camera enhanced mobile device wirelessly interfaced with an electronic device network. First, a user's control intention can be figured out based on images captured by cameras on mobile devices during a control button click. Object features from captured images are then extracted to identify visual objects a user is pointing to based on an object feature database, and corresponding functions associated with the identified objects are then enabled. Here, object features are used as an all time "transmitter" for many common tasks, making the invention very easy to deploy.

BRIEF DESCRIPTION OF THE DRAWINGS

Certain embodiments of the present invention will be described in detail on the following figures, wherein.

DETAILED DESCRIPTION OF THE INVENTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

The present invention enables an image based controller to control and manipulate objects with simple point-and-capture operations via images captured by a camera enhanced mobile device, such as a cell phone and a PDA. Powered by this technology, a user is able to complete many complicated control tasks, which can be but are not limited to, controlling a device, posting a paper document to a selected public display, making a printout of a white board, moving data among electronic devices, and overlaying a view on one part of the physical world on another part of the physical world with simple point-and-capture operations. Such guided control of objects is accomplished without utilizing laser pointers, IR transmitters, mini-projectors, or bar code tagging and/or customized wall paper are not needed for the environment control.

The image based controller can be used in conference rooms with personal paper documents, white hoards, printers, speakers, and public displays. It may also be used in home or other scenarios where people want to interact with various objects. Such controller enjoys at least the following advantages:

First, since cameras are widely installed on cell phones, PDAs, and many other mobile devices, the invention makes it easy for a person to use a cell phone as a general remote control or personalize control actions on a mobile device, saving the burden of tracking various remote controls.

Second, it can be deployed easily since it does not need as transmitter/receiver pair to achieve the control task, giving opportunity for reducing power, weight, and cost of fixed cameras and extra hardware installations in many control environments.

Third, this technique can be easily customized according to users' needs by associating some captured photos with control actions.

Moreover, it is flexible enough to adjust the positioning of the physical object up to all 6 DOF according to the complexity of control tasks.

Figure 1:
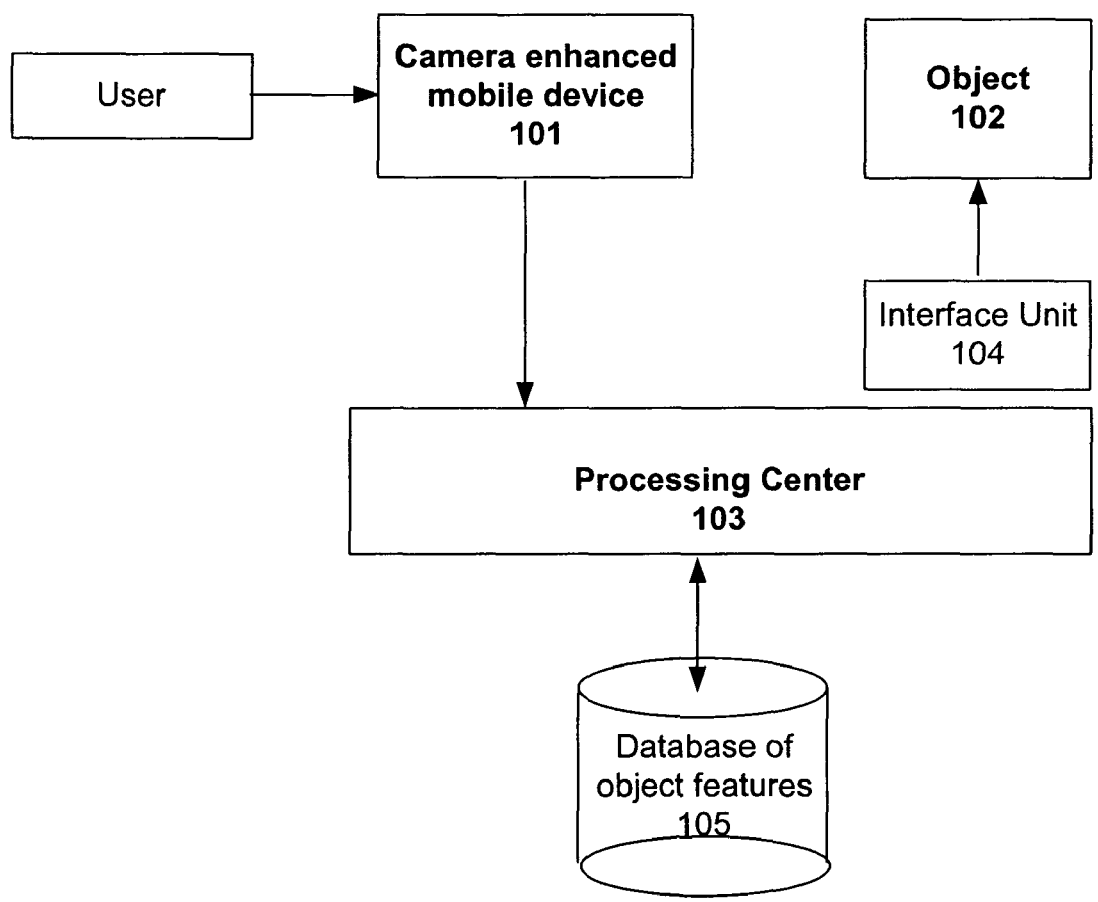
FIG. 1 is an illustration of an exemplary image based controller in one embodiment of the present invention.

FIG. 1 is an illustration of an exemplary image based controller in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, a user can operate a camera enhanced mobile device 101 to point to and capture images of an object (device) 102 of interest and send the images to a processing center 103. The processing center 103 is operable to analyze the captured images, identify the object the user points to based on a database of object features 105, and interact with and/or control the object via an interface unit 104, which can have backward compatibility if the object is a traditional device. Here, the processing center can be a stand-alone computing unit or an embedded unit in mobile devices or service centers. The ability of the system to process images of fast and continuous operation of an object at a high frame rate depends on the computing power of the processing center. The surface of the object may require textures or some patterns pasted on it for image identification, which is more convenient than installing extra hardware like a JR receiver.

Here, an object can be a visible networked device, which can be but is not limited to, video projector, side and rear flat panels, front and back room loudspeakers, normal television, air conditioner. It can also be a visible physical object not connected to anywhere, which can be but it not limited to, paper documents, white boards, traditional instruments not connected to any network. It can even be the audio signal recorded by a microphone attached to a mobile device.

Figure 2:
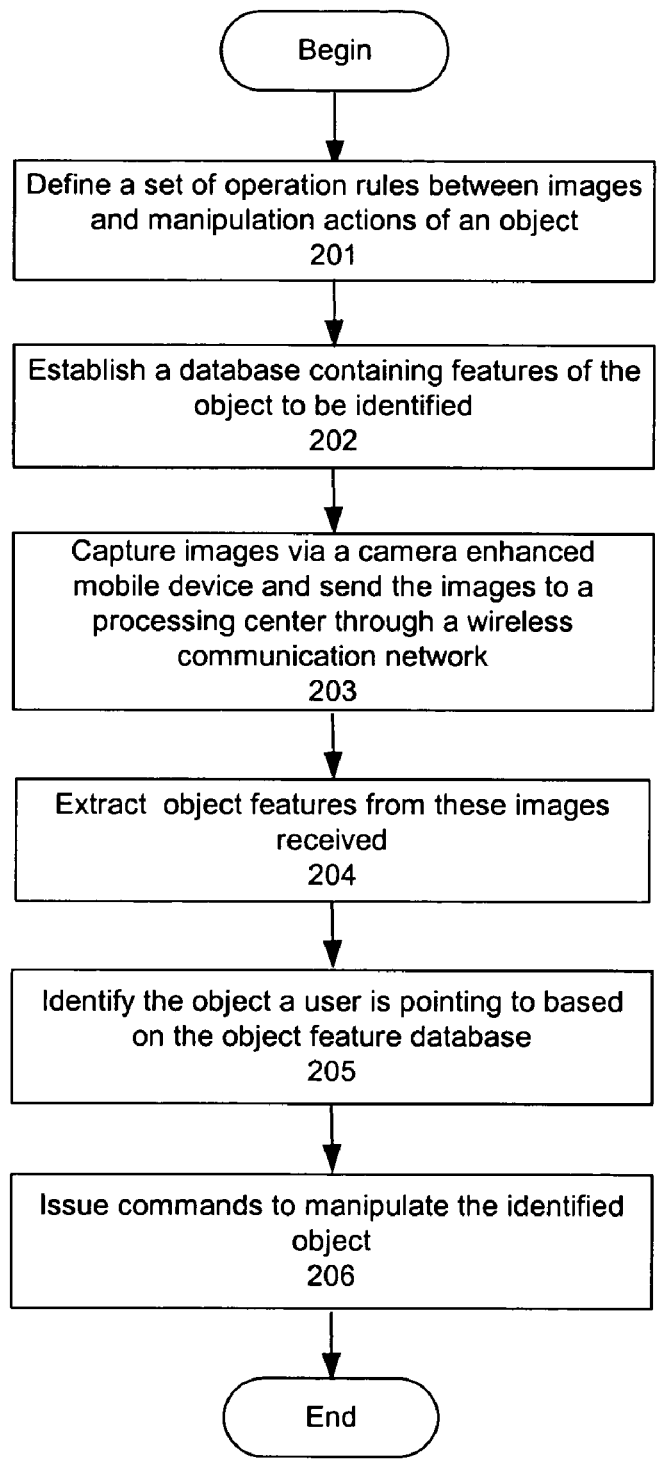
FIG. 2 is a flow chart illustrating an exemplary object identification process via the image based controller in one embodiment of the present invention.

FIG. 2 is a flow chart illustrating an exemplary object identification process via the image based controller in one embodiment of the present invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, a set of operation rules can be defined between images and manipulation actions of an object at step 201, and a database containing features of the object to be identified can be established at step 202. Images can be captured via a camera enhanced mobile device and send the images to a processing center through Internet or a wireless communication network at step 203. After the processing center receives the images, it extracts object features from these images at step 204, identifies the object a user is pointing to based on an object feature database at step 205, and issues commands to manipulate the identified object at step 206. If the controlled object is on the same communication network, the processing center can send these commands to the device directly through the network. If the object can only be controlled by Infra-Red (IR) signals, the command can be transformed to IR signals to control the object.

In some embodiments, the procedure and operation rules between object images and manipulation actions can include but are not limited to:

1. Identify all objects in a first image.
2. Identify the object that is closest to the center of the first image, and name it Object One.
3. Identify all objects in a second image.
4. Identify the object that is closest to the center of the second image, and name it Object Two.
5. If Object One and Object Two are the same and Object One is controllable, pop out Object One's control menu on the mobile device display. For a non-limiting example, if Object One is a washing machine, the washing machine's control menu should be popped out for machine manipulation.
6. If Object One and Object Two are different controllable objects, transfer Object One's content to Object Two. For a non-limiting example, if Object One is a DVD player and Object Two is a TV, the system should play a DVD disk in the player on the TV display.
7. If Object One is not controllable and Object Two is controllable, show the image of Object One on the display of Object Two. For a non-limiting example, if Object One is a paper and Object Two is a public display, the system should post the image of the paper on the public display.
8. If Object One is controllable and Object Two is not controllable, transfer the content of Object One to the surface of Object Two. For a non-limiting example, if Object One is a video player and Object Two is a table top, the system should overlay a video saved in the player on the table top.
9. If neither Object One nor Object Two are controllable, the system can overlay the image of Object One on Object Two (assume a proper projection device is available.)

These rules can be easily customized according to users' needs when associating some captured photos with control actions. Moreover, it is flexible to adjust the DOF up to 6 according to the complexity of control tasks.

In some embodiments, the object identification process can utilize a plurality of features that include but are not limited to, Scale Invariant Feature Transform (SIFT), Gabor feature, Discrete Cosine Transform (DCT) coefficients, and Optical Character Recognition (OCR) results. Data captured by other sensors on the mobile device may also be considered as additional features for object identifications. For a non-limiting example, SIFT can be used to identify a controller pointed object (device) in a controller submitted image. SIFT computes descriptive local features of an image based on histograms of edge orientation in a window around each point in the image. Each SIFT feature vector has 128 dimensions, such large dimension can greatly reduce mismatch in various scenarios. SIFT feature can also achieve reliable matching over a wider viewpoint angle, which is very important for handling images captured at various locations. Since the SIFT feature is a local feature, it is reliable even with partial occlusion of a screen, which can also be important in various situations.

An application of the image based controller can be illustrated by the following non-limiting example, where there three public displays in a conference room and images are captured at various locations in the room. Because images were captured at random places in the room, the views of these three displays have nearly random affine transformations. The goal is to identify the display a camera is pointing to based on the image captured by the camera.

Figure 3:
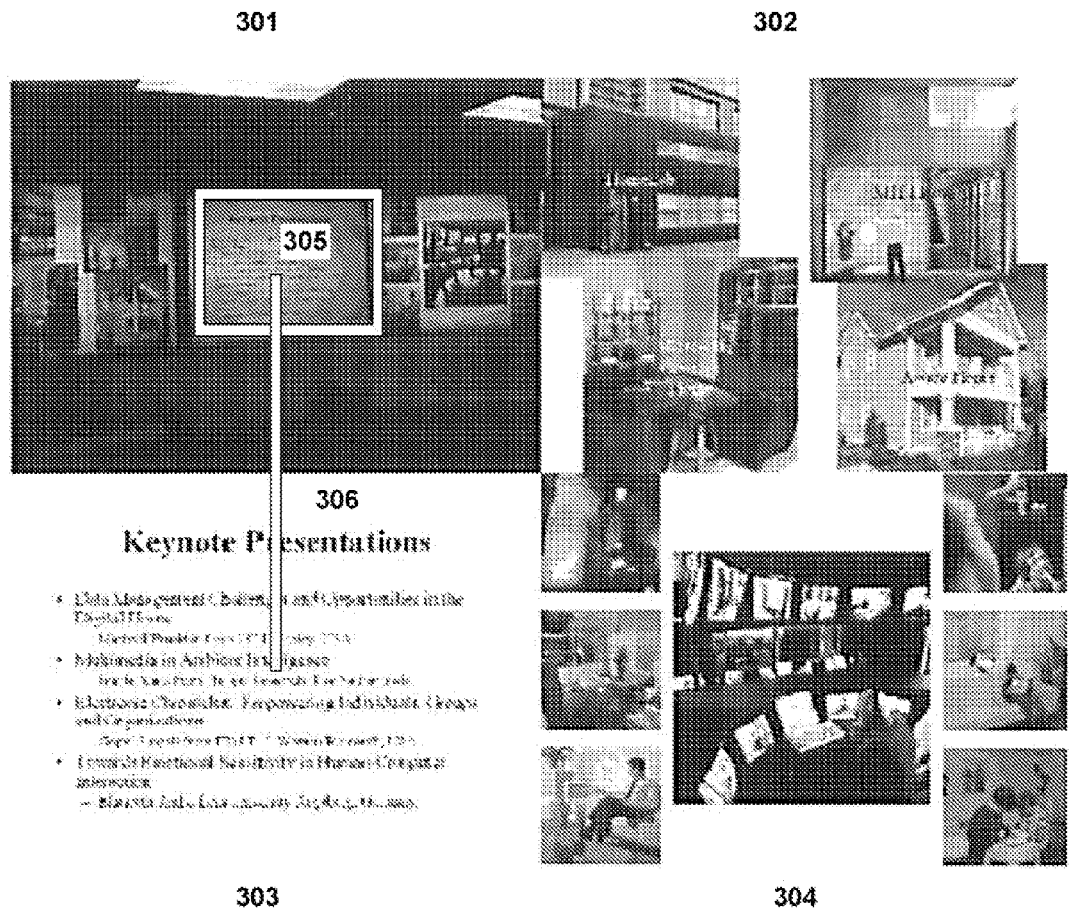
FIG. 3-5 illustrate exemplary identification results of a display the user points to in a conference room in one embodiment of the present invention.
Figure 4:
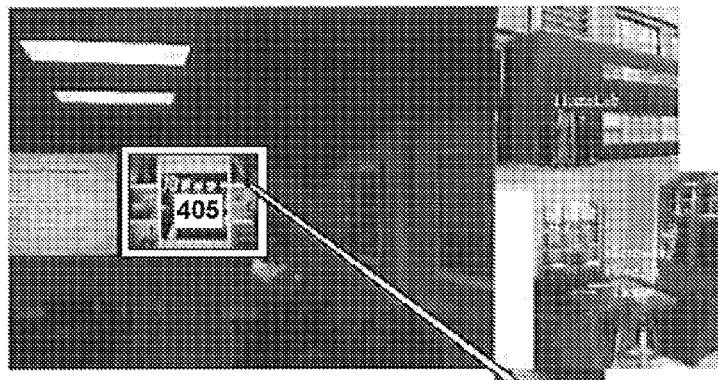
Figure 4:
Figure 4:
Figure 5:
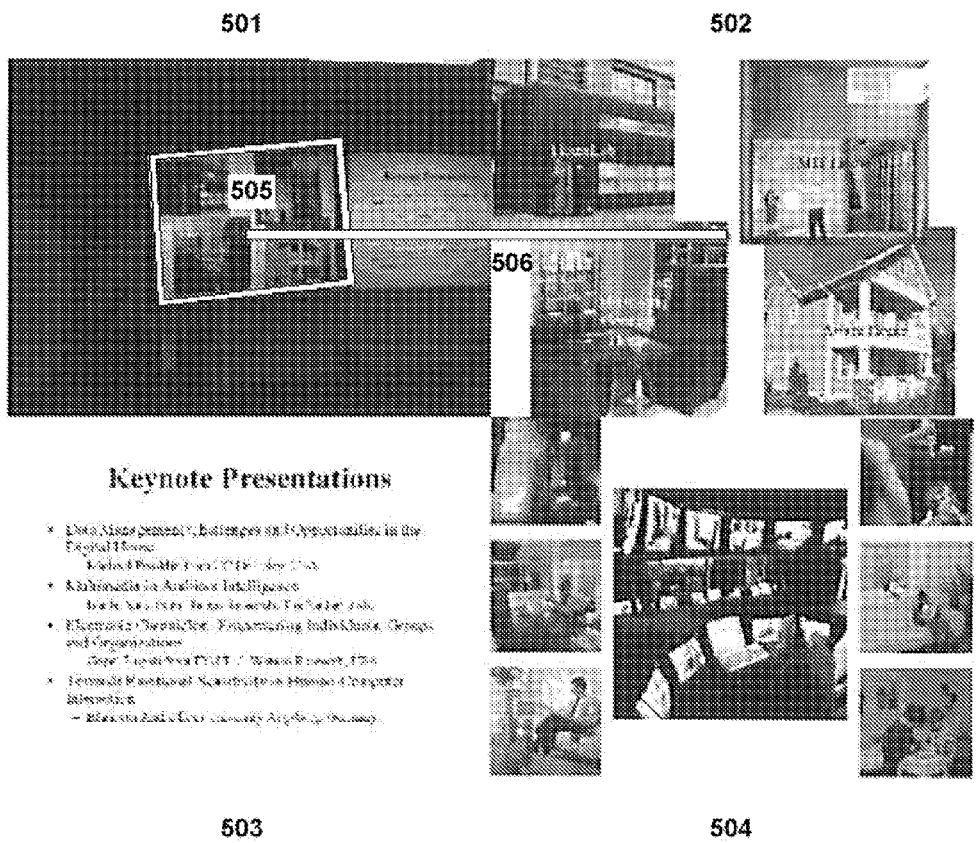

FIG. 3-5 illustrate exemplary identification results of the display the user points to. In each set of images, the top left image 301 (401 and 501) is the image captured by a mobile device at a random location in the conference room; images at top right 302 (402 and 502), bottom left 303 (403 and 503), and bottom right 304 (404 and 504) are screen shots of three displays, respectively. During the manipulation procedure, these current screen shots of three displays are sent to the processing center to establish the feature database of the three displays. When the processing center receives the mobile device captured image, it automatically locates the display the user is pointing to based on these four images. In each image set, the rectangle illustrates the boundary of the closest display 305 (405 and 505) to the center, and the line segment 306 (406 and 506) links the closest display to the identified screen shot 303 (404 and 502) of a display. With the formation of this association, it will be easy for the processing center to decide the ID or IP number of the focused display and perform manipulations based on that. By correctly identifying these objects, users should be able to drag slides among displays or drag a paper document on a desk to a public display.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "module" is used in the embodiments of the systems and methods described above, it will be evident that such concept can be interchangeably used with equivalent concepts such as, component, bean, class, method, type, interface, object model, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system to support image based object controlling, comprising:
    a camera enhanced mobile device operable to:
        point to and capture one or more images of an object of interest; and
        send the captured one or more images of the object to a processing center via a network;
    a database of object features containing features of a plurality of objects;
    said processing center operable to:
        extract a plurality of features of the object from the one or more images captured by the camera enhanced mobile device;
        identify the object the user points to based on the database of object features; and
        manipulate and control the identified object via an interface unit; and
    said interface unit operable to interact with both the processing center and the object.

2. The system according to claim 1, wherein:
the object is one of a visible networked device and a visible un-networked physical object.

3. The system according to claim 2, wherein:
the visible networked device is one of: a video projector, a side or rear flat panel, a front or back room loudspeaker, a television, and an air conditioner.

4. The system according to claim 2, wherein:
the visible un-networked physical object is one of a paper document, a white board, a traditional instruments not connected to any network, and an audio signal recorded by a microphone attached to a mobile device.

5. The system according to claim 1, wherein:
the camera enhanced mobile device is one of a cell phone and a PDA.

6. The system according to claim 1, wherein:
the network is one of Internet and a wireless communication network.

7. The system according to claim 1, wherein:
each of the plurality of features of the object is one of: a Scale Invariant Feature Transform (SIFT) feature, a Gabor feature, a Discrete Cosine Transform (DCT) coefficient, an Optical Character Recognition (OCR) results, and data captured by other sensors on the camera enhanced mobile device.

8. The system according to claim 1, wherein:
the processing center is one of a stand-alone computing unit and an embedded unit in a mobile device or a service center.

9. The system according to claim 1, wherein:
the interface unit has backward compatibility if the object is a traditional device.

10. The system according to claim 1, wherein:
The processing center is operable to manipulate the object by sending a command to the object if the object is on the same network or transforming the command into Infra-Red (IR) signals to control the object.

11. A method to support image based object controlling, comprising:
    establishing a database containing features of a plurality of objects;
    capturing one or more images of an object via a camera enhanced mobile device and sending the one or more images to a processing center via a network;
    extracting a plurality of features of the object from the one or more images captured by the camera enhanced mobile device;

identifying the object the user points to based on the database of object features; and manipulating and controlling the identified object via commands.

12. The method according to claim 11, further comprising:

defining a plurality of operation rules between the one or more images of the object and its manipulation actions.

13. The method according to claim 11, further comprising:

interacting with the object via an interface unit if the object is a traditional device.

14. The method according to claim 11, further comprising:

manipulating the object by sending a command to the object if the object is on the same network or transforming the command into Infra-Red (IR) signals to control the object.

15. The method according to claim 11, further comprising:

identifying the object in the one or more images via Scale Invariant Feature Transform (SIFT).

16. A non-transitory computer readable storage medium having instructions stored thereon that when executed cause a system to:

establish a database containing features of a plurality of objects;

capture one or more images of an object via a camera enhanced mobile device and send the one or more images to a processing center via a network;

extract a plurality of features of the object from the one or more images captured by the camera enhanced mobile device;

identify the object the user points to based on the database of object features; and manipulate and control the identified object via commands.

17. A system to support image based object controlling, comprising:

means for establishing a database containing features of a plurality of objects;

means for capturing one or more images of an object via a camera enhanced mobile device and sending the one or more images to a processing center via a network;

means for extracting a plurality of features of the object from the one or more images captured by the camera enhanced mobile device;

means for identifying the object the user points to based on the database of object features; and means for manipulating and controlling the identified object via commands.

\* \* \* \* \*